(12) United States Patent
Zhang et al.

(10) Patent No.: US 11,506,643 B2
(45) Date of Patent: Nov. 22, 2022

(54) FLAME PHOTOMETRIC DETECTOR

(71) Applicant: Rosemount Inc., Shakopee, MN (US)

(72) Inventors: Edward Zhang, Cypress, TX (US);
Willis Watkins, Cypress, TX (US);
Steven S. Black, Houston, TX (US)

(73) Assignee: Rosemount Inc., Shakopee, MN (US)

( * ) Notice: Subject to any disclaimer, the term of this patent is extended or adjusted under 35 U.S.C. 154(b) by 183 days.

(21) Appl. No.: 16/881,296

(22) Filed: May 22, 2020

(65) Prior Publication Data

US 2021/0364484 A1 Nov. 25, 2021

(51) Int. Cl.
*G01N 30/64* (2006.01)
*G01N 30/20* (2006.01)
*G01N 30/02* (2006.01)
*G01N 30/68* (2006.01)

(52) U.S. Cl.
CPC .............. *G01N 30/64* (2013.01); *G01N 30/20* (2013.01); *G01N 2030/025* (2013.01); *G01N 2030/685* (2013.01)

(58) Field of Classification Search
CPC ................................................ G01N 30/64–70
See application file for complete search history.

(56) References Cited

U.S. PATENT DOCUMENTS

| | | | | |
|---|---|---|---|---|
| 3,940,987 A | * | 3/1976 | Green ..................... | G01K 1/024 374/144 |
| 4,119,404 A | * | 10/1978 | Price ...................... | G01N 21/72 356/417 |
| 4,167,334 A | * | 9/1979 | Phillips .................. | G01N 21/72 356/315 |
| 4,207,053 A | * | 6/1980 | Turner ..................... | F23Q 9/00 219/267 |
| 4,582,654 A | * | 4/1986 | Karnicky ............ | B05B 17/0607 239/102.2 |
| 5,073,753 A | * | 12/1991 | Collings .............. | G01N 27/626 436/154 |
| 5,611,846 A | * | 3/1997 | Overton ................. | G01N 30/68 95/82 |

(Continued)

FOREIGN PATENT DOCUMENTS

CN 108592647 A * 9/2018
DE 3203149 C2 * 4/1990 ............. H01T 13/40

(Continued)

OTHER PUBLICATIONS

International Search Report and Written Opinion, dated Sep. 10, 2021, for International Patent Application No. PCT/US2021/033343, 10 pages.

*Primary Examiner* — David L Singer
(74) *Attorney, Agent, or Firm* — Christopher R. Christenson; Kelly, Holt & Christenson, PLLC

(57) ABSTRACT

A flame photometric detector for a process gas chromatograph is provided. The flame photometric detector includes a combustion chamber body defining a combustion chamber therein. A sample inlet tube is configured to introduce a process gas sample into the combustion chamber. An ignitor is configured to initiate combustion within the combustion chamber. A thermocouple assembly is configured to provide an indication of temperature within the combustion chamber. The sample tube has an end that is adjustable relative to the combustion chamber.

12 Claims, 18 Drawing Sheets

(56) References Cited

U.S. PATENT DOCUMENTS

| | | | | |
|---|---|---|---|---|
| 2005/0069455 A1* | 3/2005 | Staphanos | ............ | G01N 33/287 436/119 |
| 2005/0287033 A1* | 12/2005 | Thurbide | ............... | G01N 21/72 422/51 |
| 2006/0213875 A1* | 9/2006 | Shibamoto | .............. | F23N 5/082 219/121.5 |
| 2014/0118742 A1* | 5/2014 | Rhodes | .................... | H05B 3/40 356/417 |
| 2014/0119993 A1* | 5/2014 | Rhodes | ................ | G01N 21/766 422/54 |
| 2015/0015885 A1* | 1/2015 | Garff | ..................... | G01N 30/68 356/417 |

FOREIGN PATENT DOCUMENTS

| | | | |
|---|---|---|---|
| JP | 07-181156 A | | 7/1998 |
| JP | 4174600 B2 | | 11/2008 |
| JP | 3210660 U | * | 6/2017 |

\* cited by examiner

FLAME PHOTOMETRIC DETECTOR

BACKGROUND

Gas chromatography is the separation of a mixture of chemical compounds due to their migration rates through a chromatographic column. This separates the compounds based on differences in boiling points, polarity, or molecular size. The separated compounds then flow across a suitable detector, such as a flame photometric detector (FPD), that determines the concentration and/or presence of each compound represented in the overall sample. Knowing the concentration or presence of the individual compounds makes it possible to calculate certain physical properties such as BTU or a specific gravity using industry-standard equations.

In operation, a sample is often injected in to a chromatographic column filled with a packing material. Typically, the packing material is referred to as a "stationary phase" as it remains fixed within the column. A supply of inert carrier gas is then provided to the column in order to force the injected sample through the stationary phase. The inert gas is referred to as the "mobile phase" since it transits the column.

As the mobile phase pushes the sample through the column, various forces cause the constituents of the sample to separate. For example, heavier components move more slowly through the column relative to the lighter components. The separated components, in turn, exit the column in a process called elution. The resulting components are then fed into a detector that responds to some physical trait of the eluting components.

One type of detector is known as a flame photometric detector. The flame photometric detector uses a photo multiplier tube to detect spectral lines of the compounds as they are burned in a flame. Compounds eluting off the column are carried into a generally hydrogen fueled flame which excites specific elements in the molecules, and the excited elements (P, S, halogens, some metals) emit light of specific characteristic wavelengths. The emitted light is filtered and detected by the photo multiplier tube. In particular, phosphorous emission is around 510-536 nm and sulfur emission is around 394 nm.

SUMMARY

A flame photometric detector for a process gas chromatograph is provided. The flame photometric detector includes a combustion chamber body defining a combustion chamber therein. A sample inlet tube is configured to introduce a process gas sample into the combustion chamber. An ignitor is configured to initiate combustion within the combustion chamber. A thermocouple assembly is configured to provide an indication of temperature within the combustion chamber. The sample tube has an end that is adjustable relative to the combustion chamber.

DETAILED DESCRIPTION OF ILLUSTRATIVE EMBODIMENTS

A conventional flame photometric detector burner generally comprises a flame chamber, externally plumbed top exhaust path, igniter, thermocouple, and a gas mixer. In some relatively small footprint applications, such as explosion-proof gas chromatography, it may be helpful to minimize physical size of the flame photometric detector in order to fit inside a dedicatedly temperate controlled oven. A micro burner for the flame photometric detector (uFPD), may be provided, which includes an internal exhaust path and an integrated igniter/thermocouple.

In accordance with embodiments described below, this micro flame photometric detector is able to be installed in such a small footprint application. The micro flame photometric detector, in some examples described below, may include a substantially half round shaped flame chamber that has a reduced size relative to previous designs. Further, an integrated sample tube, in some examples, is used to position the end of the sample tip at the precise location of a mixed gas stream in order to minimize the effort of tip adjustment and maximize the response of the micro flame photometric detector.

Figure 1:
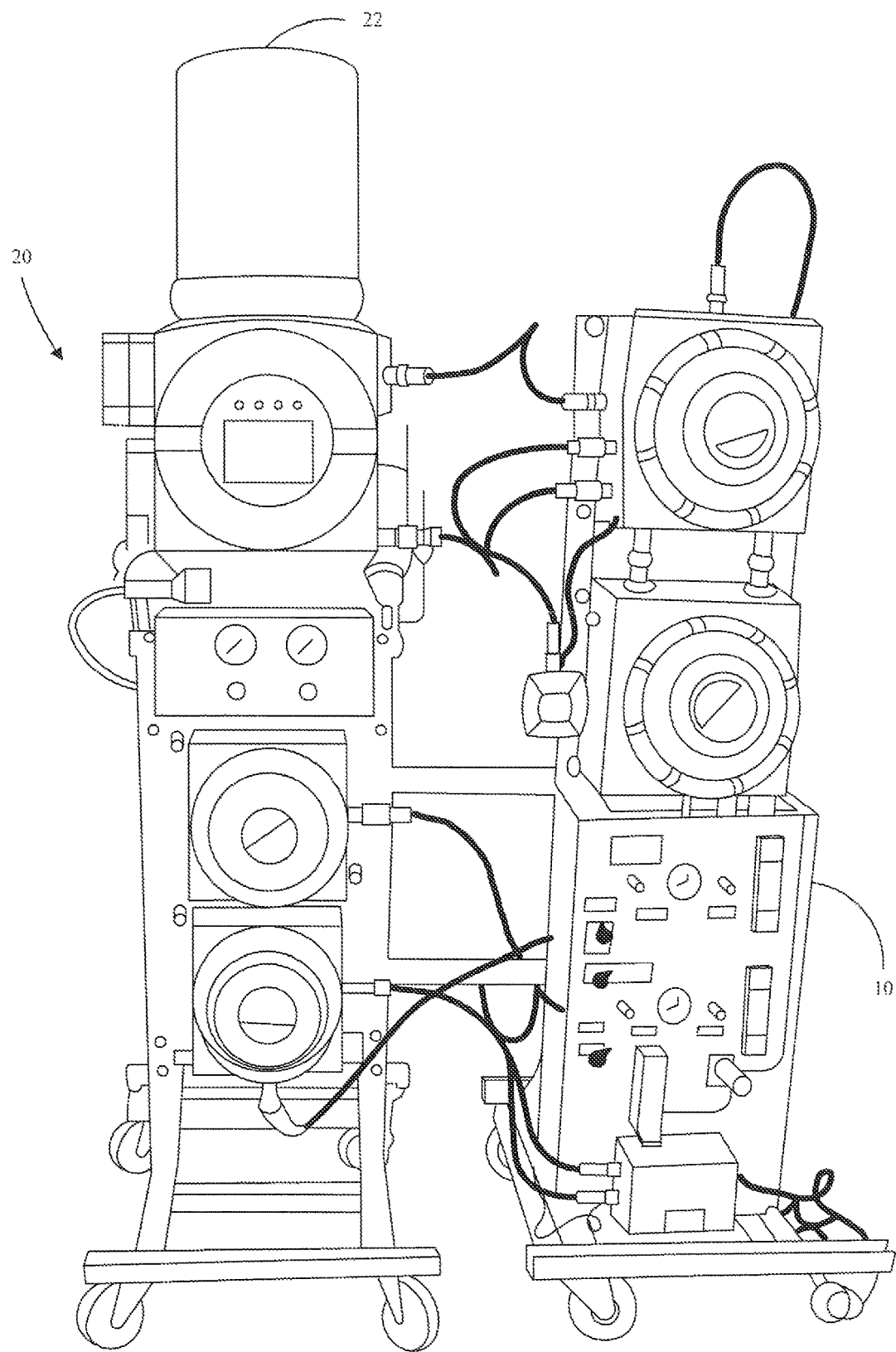
FIG. 1 is a diagrammatic view of a process gas chromatograph employing a known flame photometric detector side-cart solution in accordance with the prior art.

FIG. 1 is a diagrammatic view of a process gas chromatograph 20 employing a known flame photometric detector side-cart solution in accordance with the prior art. Side-cart 10 is shown next to the process gas chromatograph 20 and is coupled thereto via a number of lines. The side-cart solution is generally used because the flame photometric detector of the side-cart 10 cannot be physically fit within the space-limited explosion-proof oven 22 of the process gas chromatograph 20.

Before describing the flame photometric detector in detail, it is useful to first describe generally the process graph chromatograph with which it is used.

Figure 2:
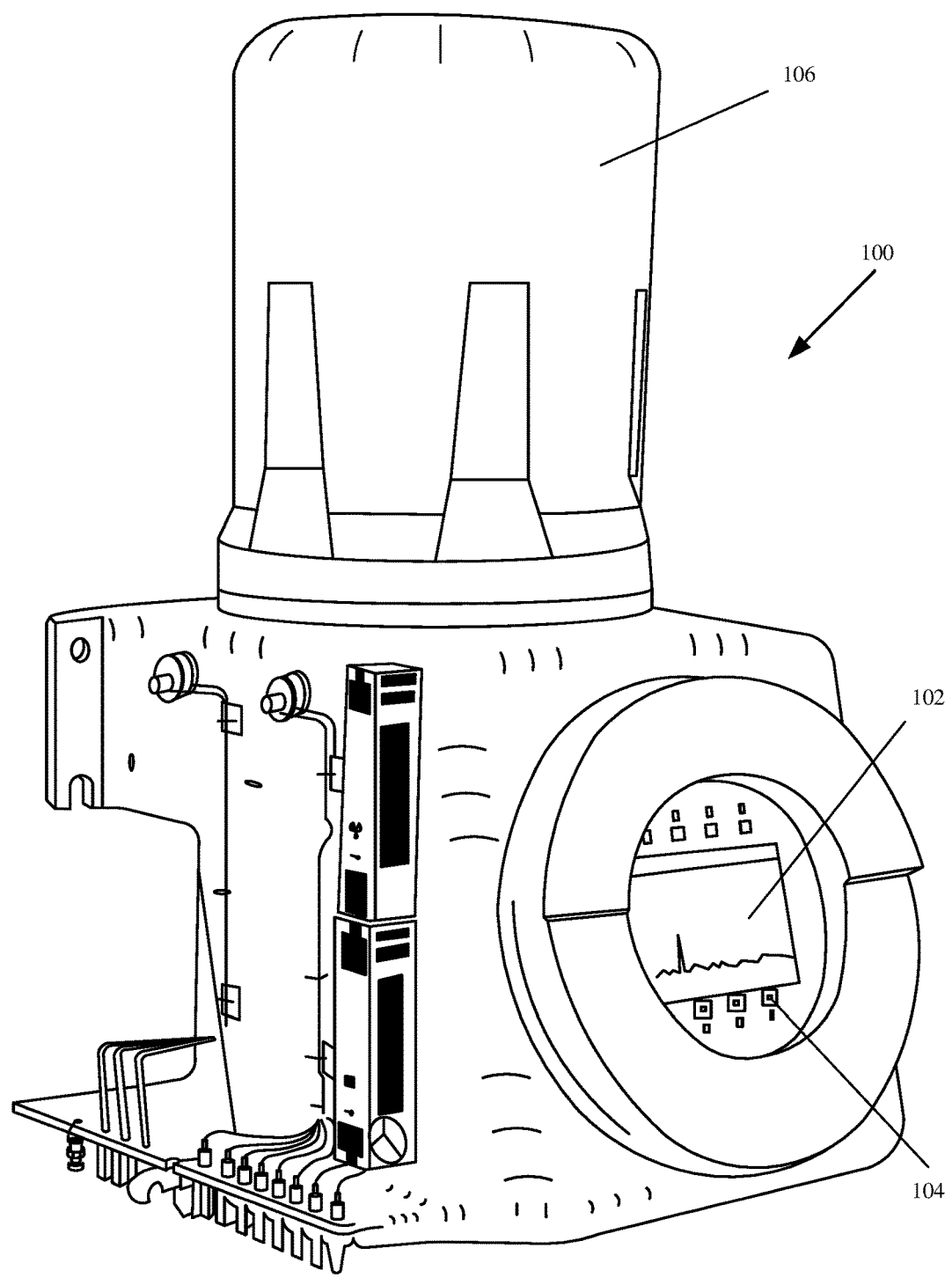
FIG. 2 is a diagrammatic view of a process gas chromatograph with which embodiments of the present invention may be used.

FIG. 2 is a diagrammatic view of a process gas chromatograph with which embodiments of the present invention may be used. While FIG. 1 illustrates a model 700XA gas chromatograph 100, available from Rosemount Inc. (Emerson Automation Solutions), methods and embodiments provided herein may be utilized with other exemplary gas analyzers. This can include model 1500XA process gas chromatographs and model 570 natural gas chromatographs, both available from Rosemount Inc., among a variety of other types and models of gas chromatographs. Additionally, it is contemplated that a wide variety of other devices, beyond gas chromatographs, may be utilized with embodiments of the present invention. As shown in FIG. 2, process gas chromatograph 100 includes a user interface 102 having a display and one or more user input mechanisms 104. Additionally, process gas chromatograph 100 includes a temperature-controlled oven 106. Components within oven 106 can be kept at very-precisely controlled temperatures in order to facilitate the analytical process.

Figure 3:
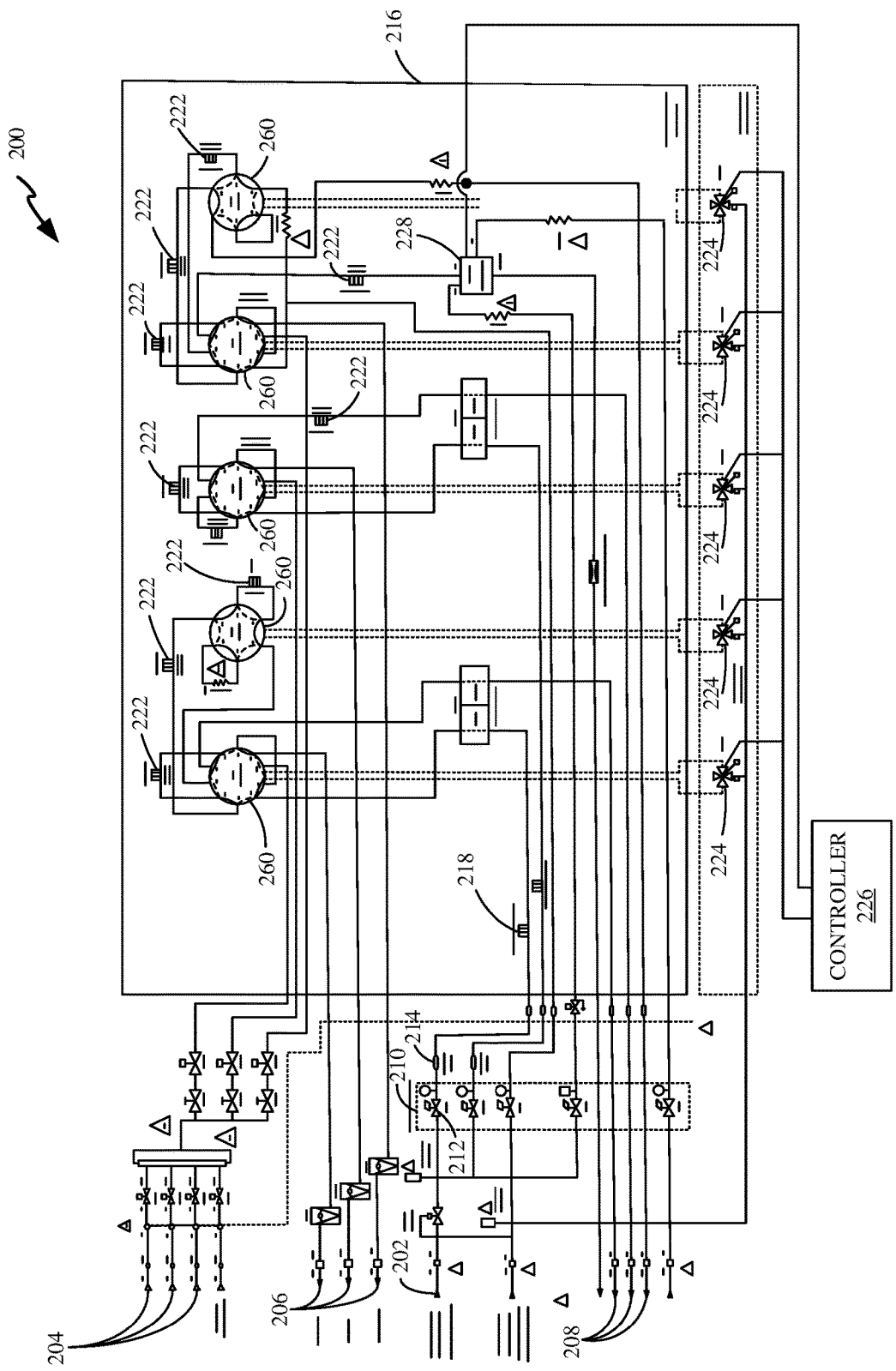
FIG. 3 is a diagrammatic system view of a gas chromatograph in accordance with an embodiment of the present invention.

FIG. 3 is a diagrammatic system view of a gas chromatograph in accordance with an embodiment of the present invention. While one example of a gas chromatograph 200 will now be provided, it is to be understood that gas chromatograph 200 can take a wide variety of other forms and configurations. For example, it is to be understood that gas chromatograph 200 may have other configurations for columns, valves, detectors, et cetera. However, in this example, gas chromatograph 200 illustratively includes a carrier gas inlet 202, a sample inlet 204, a sample vent outlet 206, and a measure vent outlet 208. In operation, carrier gas is provided to flow panel 210 where it passes through a regulator 212 and dryer 214 before entering temperature-controlled analyzer oven 216 and passing through carrier gas pre-heater 218.

During measurement, sample gas enters chromatograph 200 via sample inlet 204 and passes into analyzer oven 216. Both sample gas (during measurement), or calibration gas (during calibration), and carrier gas eventually enter a plurality of pneumatically-controlled multi-port selector valves 260 in order to selectively flow various volumes of a sample and/or carrier gas through various chromatographic columns 222 in accordance with known gas chromatography techniques. Each of pneumatically-controlled multi-port selector valve 260 is fluidically coupled to a respective solenoid 224 that receives its control signal from controller 226. Additionally, controller 226 may be coupled to one or more temperature sensors within oven 216 as well as one or more heaters thermally coupled to oven 216 in order to provide temperature control for oven 216. However, it is also contemplated that a thermal control system separate from controller 226 can also be used.

Additionally, as shown in FIG. 3, each pneumatically-controlled multi-port selector valve 260 has a pair of states. In the first state, the fluidic connections of each valve 260 are shown in solid lines. The fluid connections of each valve 260 in the second state are shown in phantom. Controller 226 is operably coupled to detector 228 which is a flame photometric detector which will be described in greater detail below. Thus, controller 226 is able to fully control flow through gas chromatograph 200 by virtue of controlling solenoids 224. Additionally, controller 226 is able to determine the response of detector 228 to detect, or otherwise characterize, various species in the sample gas. In some embodiments, controller 226 reads an analog signal from control module 34 (shown in FIG. 4). Further, controller 226 may characterize, calculate and identify peaks in the chromatogram. In this way, controller 226 is able to selectively introduce the sample into a chromatographic column for a selected amount of time, reverse the flow of gas through the chromatographic column, and direct the reversed flow through the detector to observe and/or record the detector response over time. This provides chromatographic analysis relative to the sample.

Figure 4:
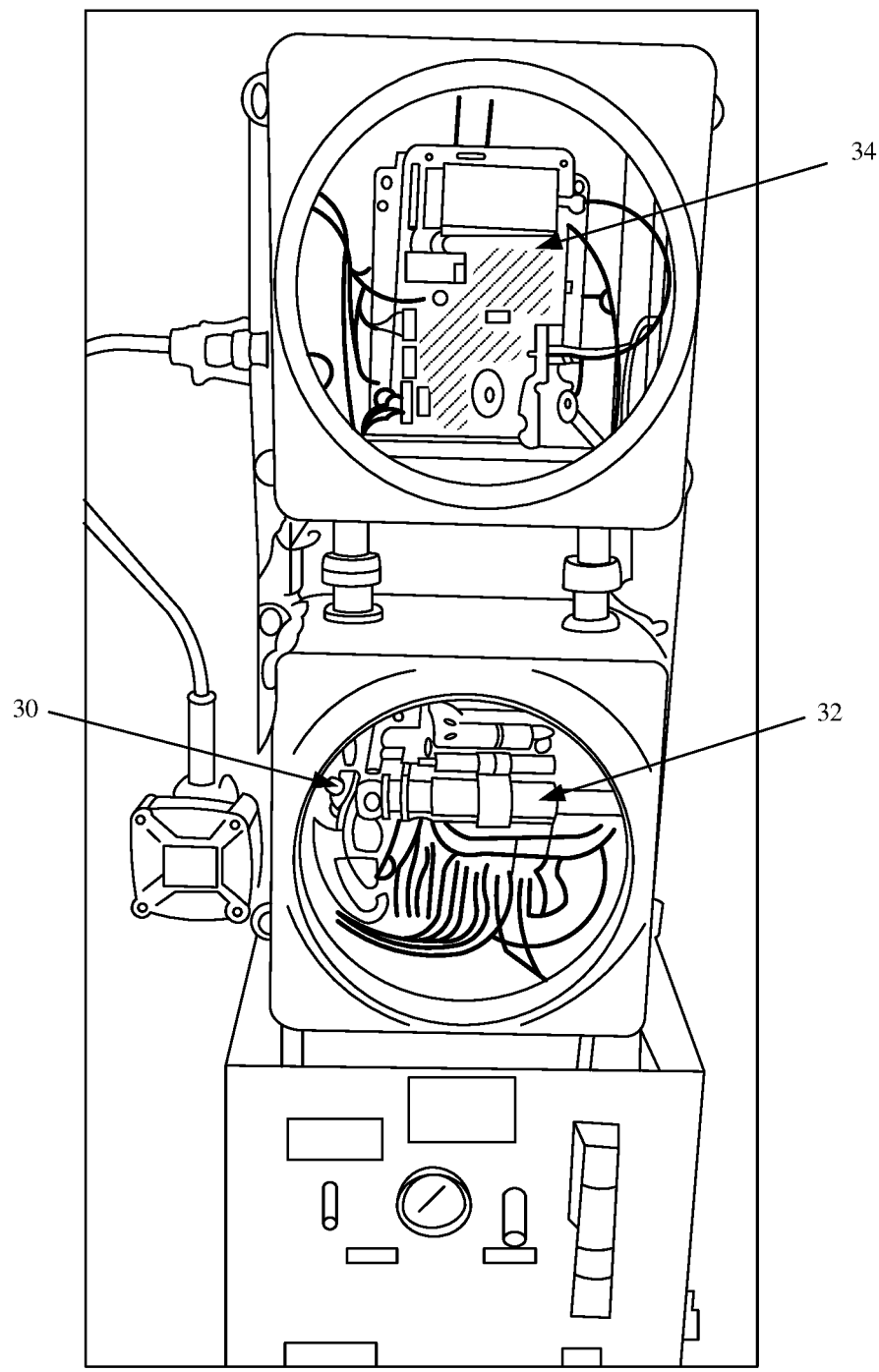
FIG. 4 is an enlarged view of the prior art flame photometric detectors used in side-cart solutions.

FIG. 4 is an enlarged view of the prior art flame photometric detectors used in side-cart solutions. As shown, a flame photometric detector burner 30 is positioned proximate photomultiplier module 32. A control module 34 is disposed above photomultiplier module 32 and controls burner 30 and photomultiplier tube module 32. In examples, the control module 34 processes and amplifies the response signal from photomultiplier tube 32 and provides it to a suitable processing device, such as controller 226.

Figure 5:
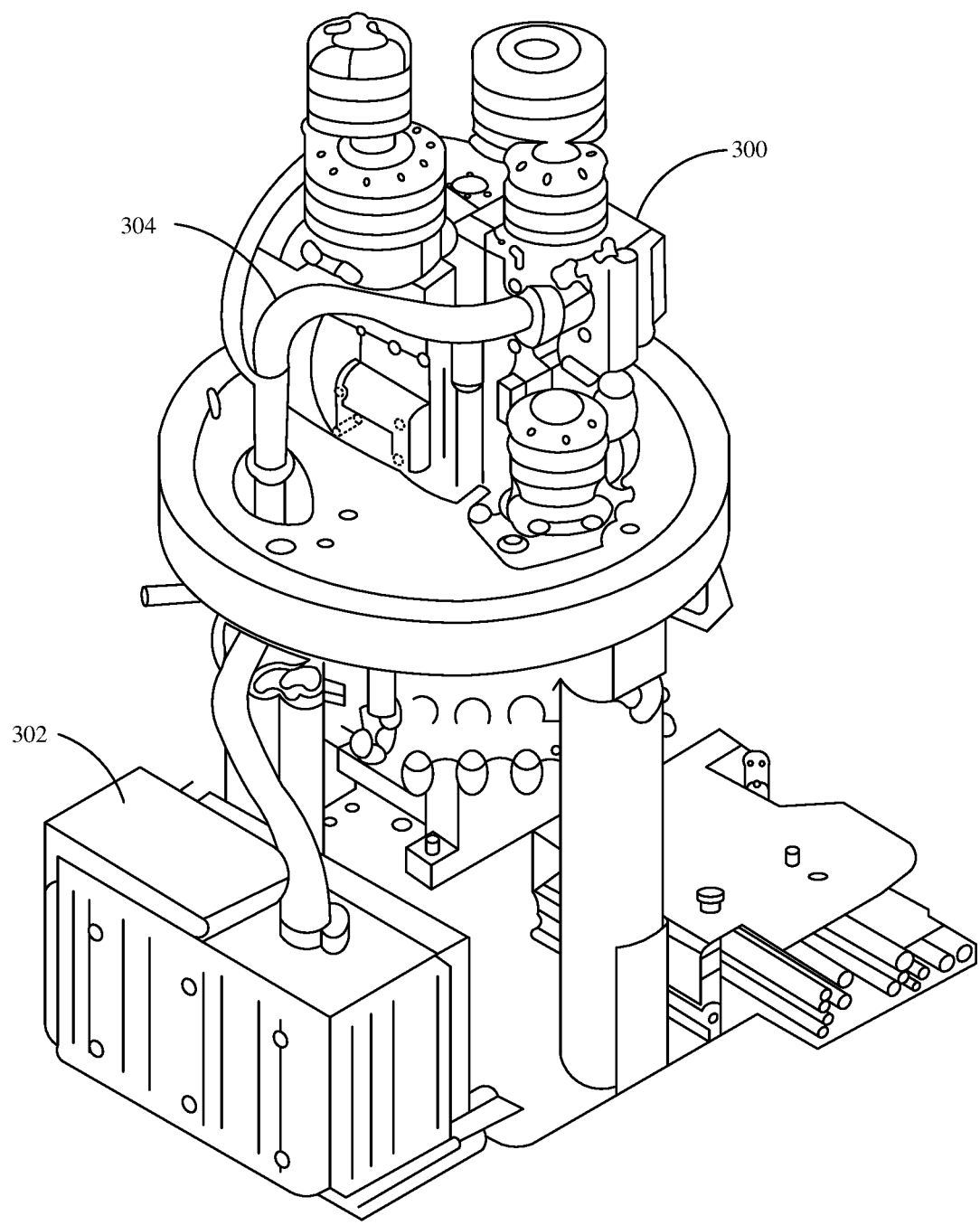
FIG. 5 is a diagrammatic perspective view of a gas chromatograph and flame photometric detector in accordance with an embodiment of the present invention.

In accordance with embodiments described herein, a micro flame photometric detector is provided that rearranges the three major components of the flame photometric detector by detaching the flame photometric detector burner and photomultiplier tube module and combines the control module and photomultiplier tube module as shown in FIG. 5. As can be seen, the micro flame photometric detector 300 is coupled to photomultiplier tube and control module 302 via a fiber cable 304. In accordance with one embodiments, the micro flame photometric detector 300 is able to be fit entirely within the volume of temperature-controlled oven 22 of the process gas chromatograph. Accordingly, what was previously an entire side-cart, now can be fit, essentially, within the gas chromatograph enclosure.

Some of the structural changes that facilitate these significant changes are shown with respect to FIG. 5 relative to FIG. 4 and are facilitated by changes in the design of the flame photometric detector itself.

Figure 6A:
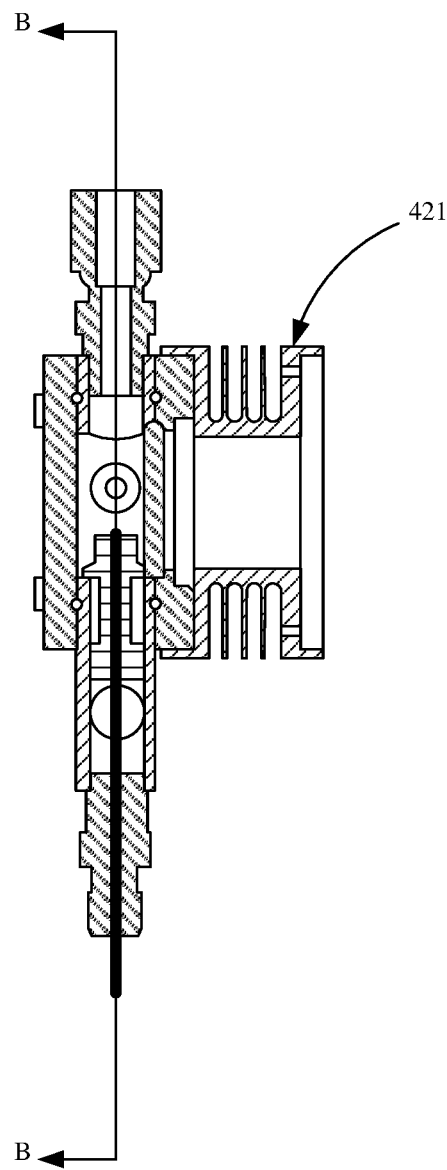
FIGS. 6A and 6B are cross-sectional views of a prior art flame photometric detector.
Figure 6B:
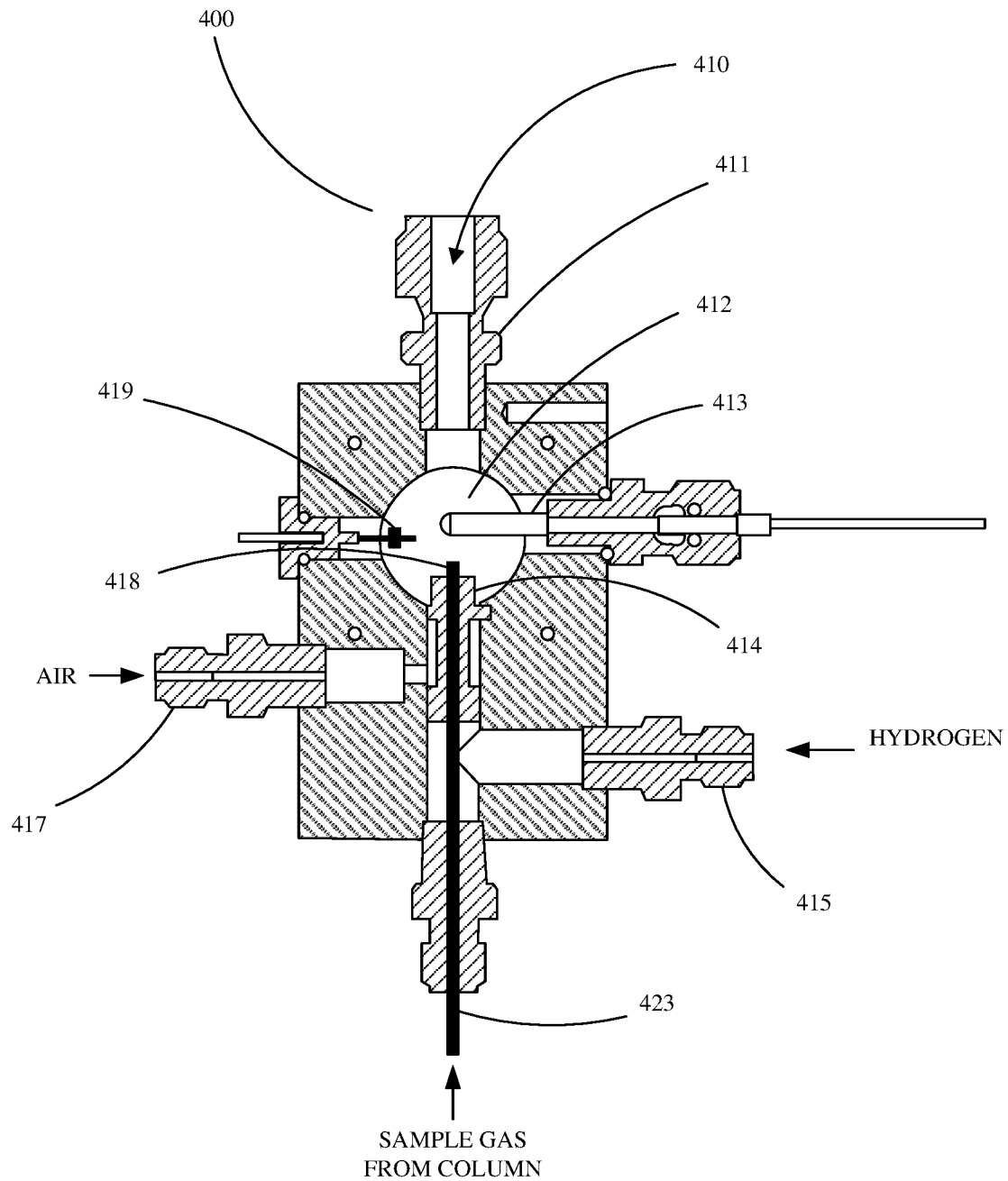

FIGS. 6A and 6B are cross-sectional views of a prior art flame photometric detector. FIG. 6B is a cross sectional view taken along line B-B in FIG. 6A. As shown in FIGS. 6A and 6B, a typical flame photometric detector burner 400 of a gas chromatograph is arranged as shown. Detector 400 has a mounting portion 421 for coupling to an optics and photomultiplier tube. During operation, air enters through fitting 417, and hydrogen enters through fitting 415. A column outflow (sample) gas is provided through sample tube 423. Air and hydrogen mix at gas mixer 414 and enter combustion chamber 412. Igniter 419 ignites flame, and gas is burned inside combustion chamber 412. Thermocouple 413 monitors the status of the flame and burnt gases vent out through exhaust path 410 of fitting 411. Light with a particular wavelength is generated from the flame and is detected. The responses of the flame photometric detector are very sensitive to the end position 418 of sample tube 423 relative to gas mixer 414. The responses of the flame photometric detector can be maximized by moving the sample tube 423 up and down with the same gas mixing ratio. It is necessary to vent the burnt gas properly from the flame photometric detector burner for safety reasons for most applications, such as detecting sulfur components in natural gases.

Figure 7A:
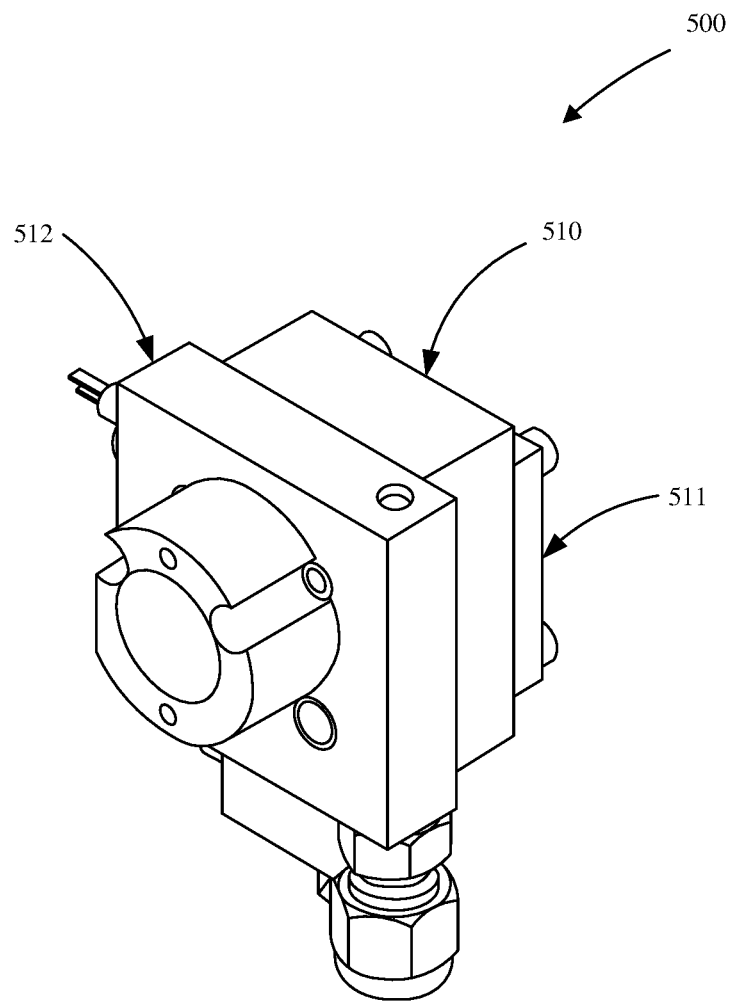
FIGS. 7A and 7B are perspective and side elevation views, respectively, of a micro flame photometric detector in accordance with an embodiment of the present invention.
Figure 7B:
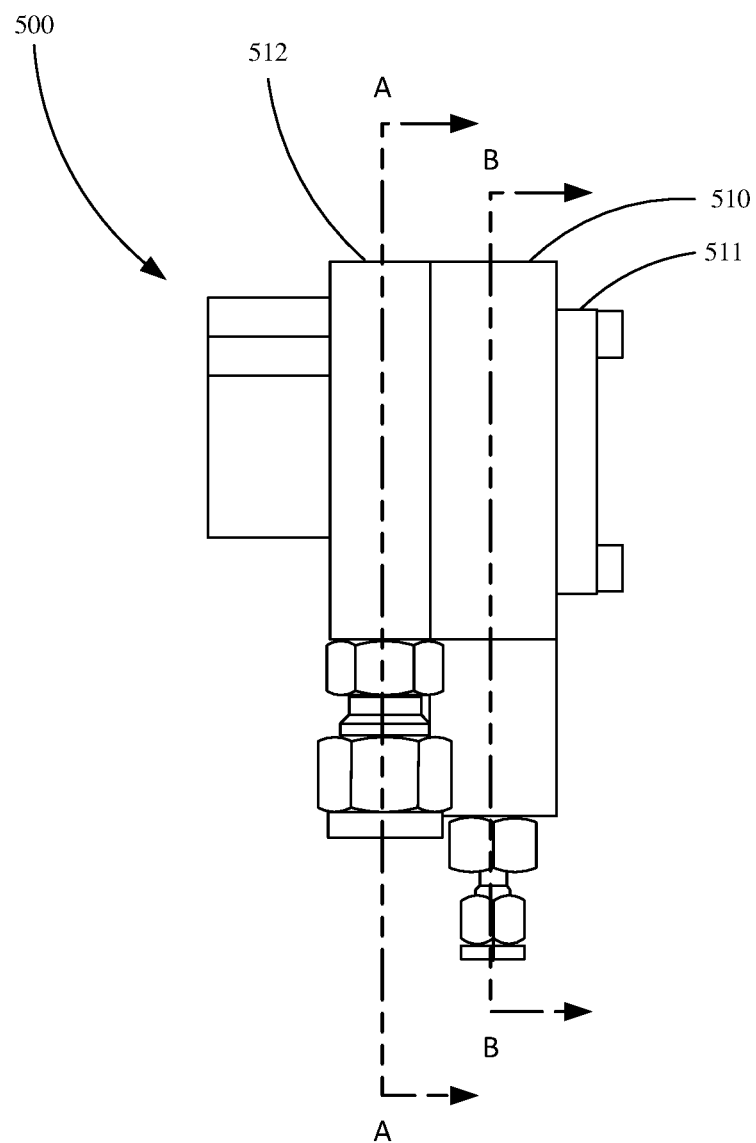

FIGS. 7A and 7B are perspective and side elevation views, respectively, of a micro flame photometric detector in accordance with an embodiment of the present invention. In order to efficiently route exhaust from the burning flame, internal exhaust paths within micro flame photometric detector 500 reroute the vent fitting to the exact location needed to minimize the physical size of the burner and simplify the plumbing. These internal flow paths of embodiments of the present invention are shown in greater detail in FIGS. 7C, 7D, and 7E. Micro flame photometric detector 500 includes combustion chamber body 510, connector 512, and cover 511.

Figure 7C:
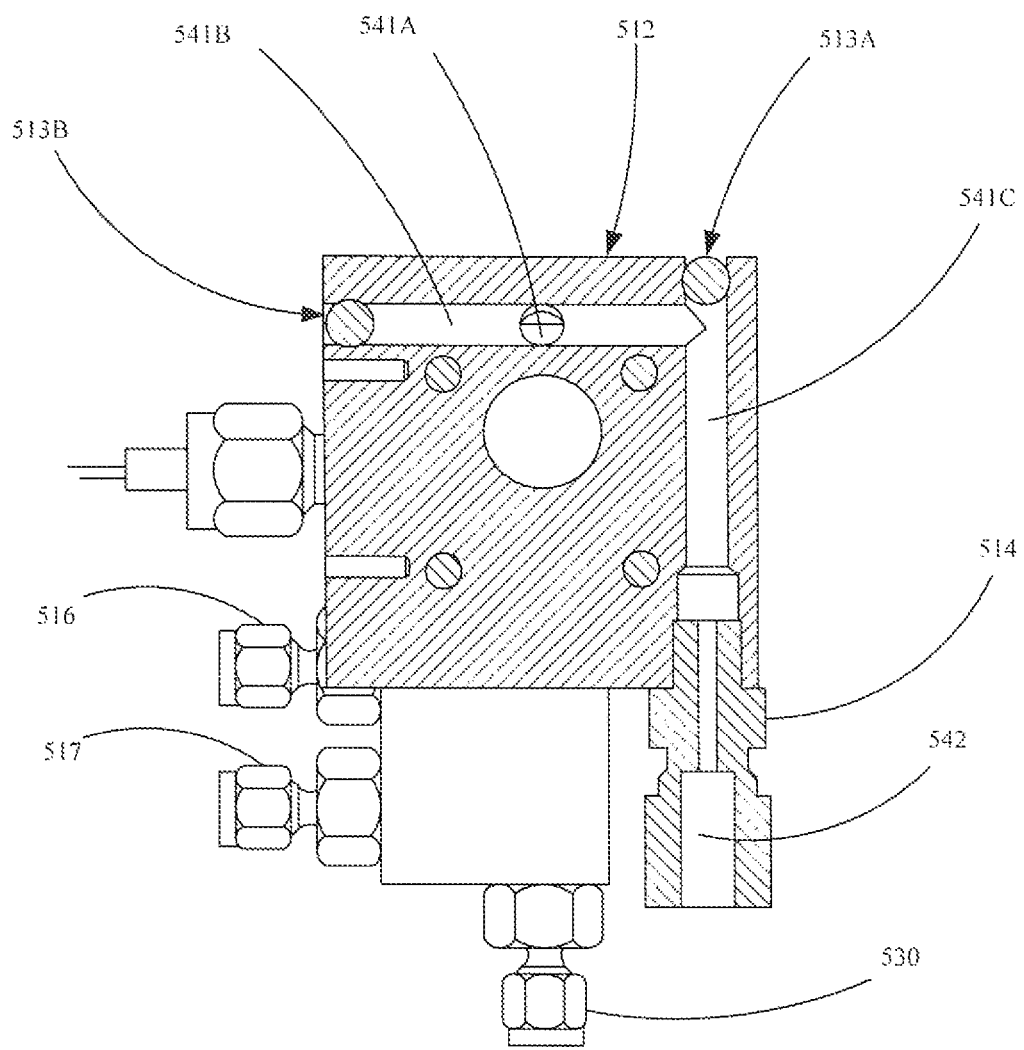
FIGS. 7C-7F are various diagrammatic cutaway and cross-sectional views of a micro flame photometric detector in accordance with an embodiment of the present invention.
Figure 7D:
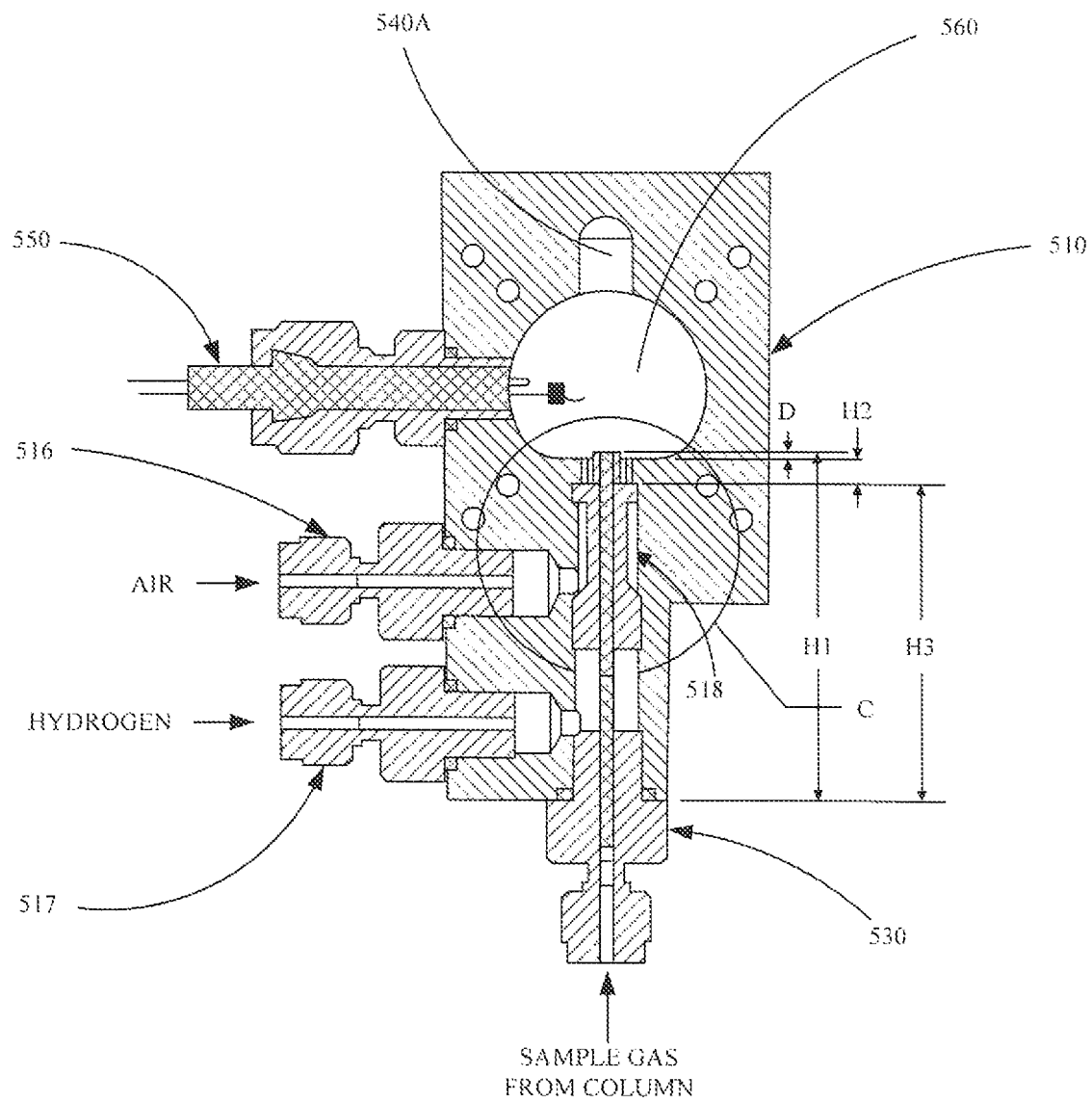
Figure 7E:
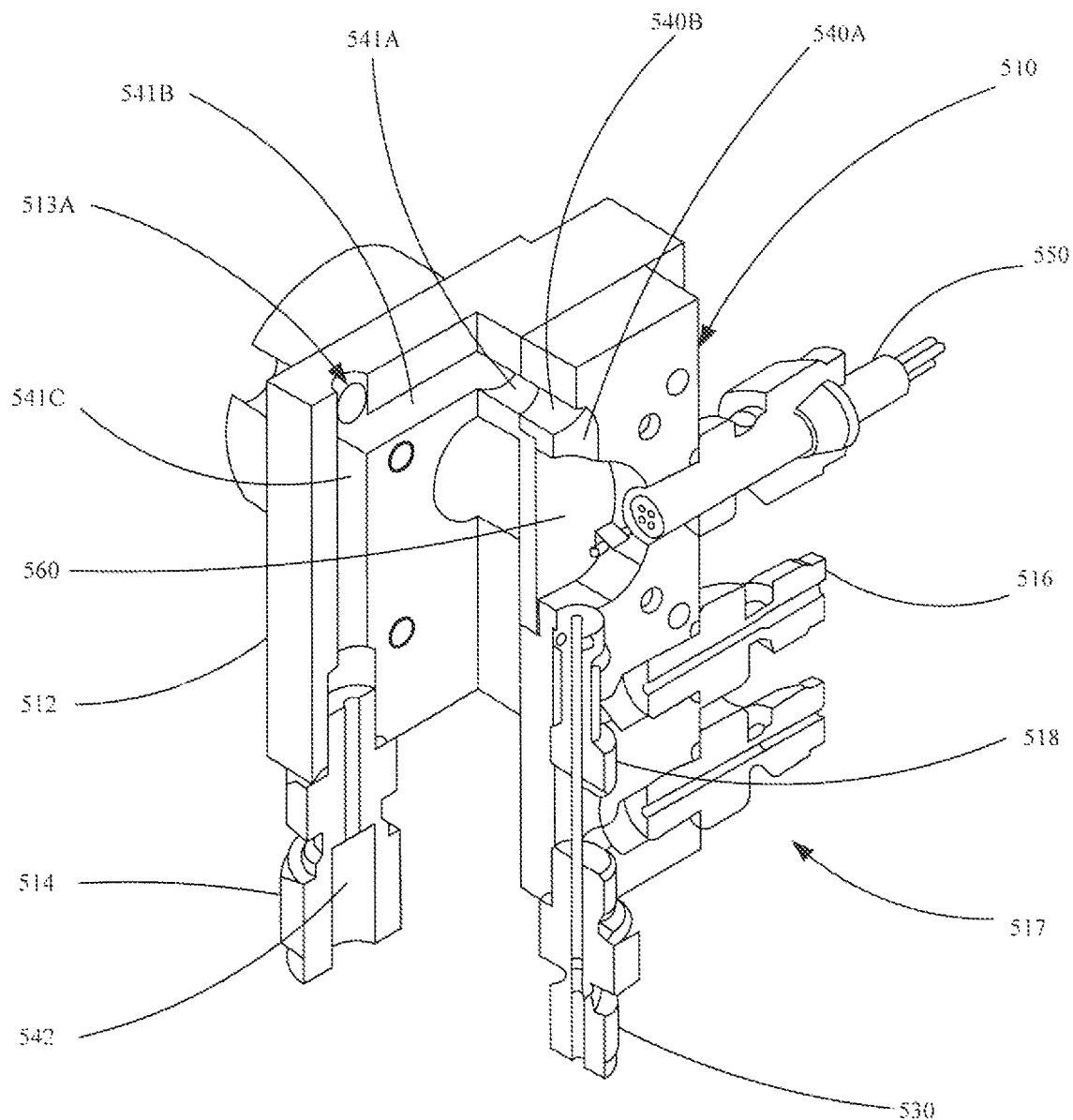
Figure 7F:
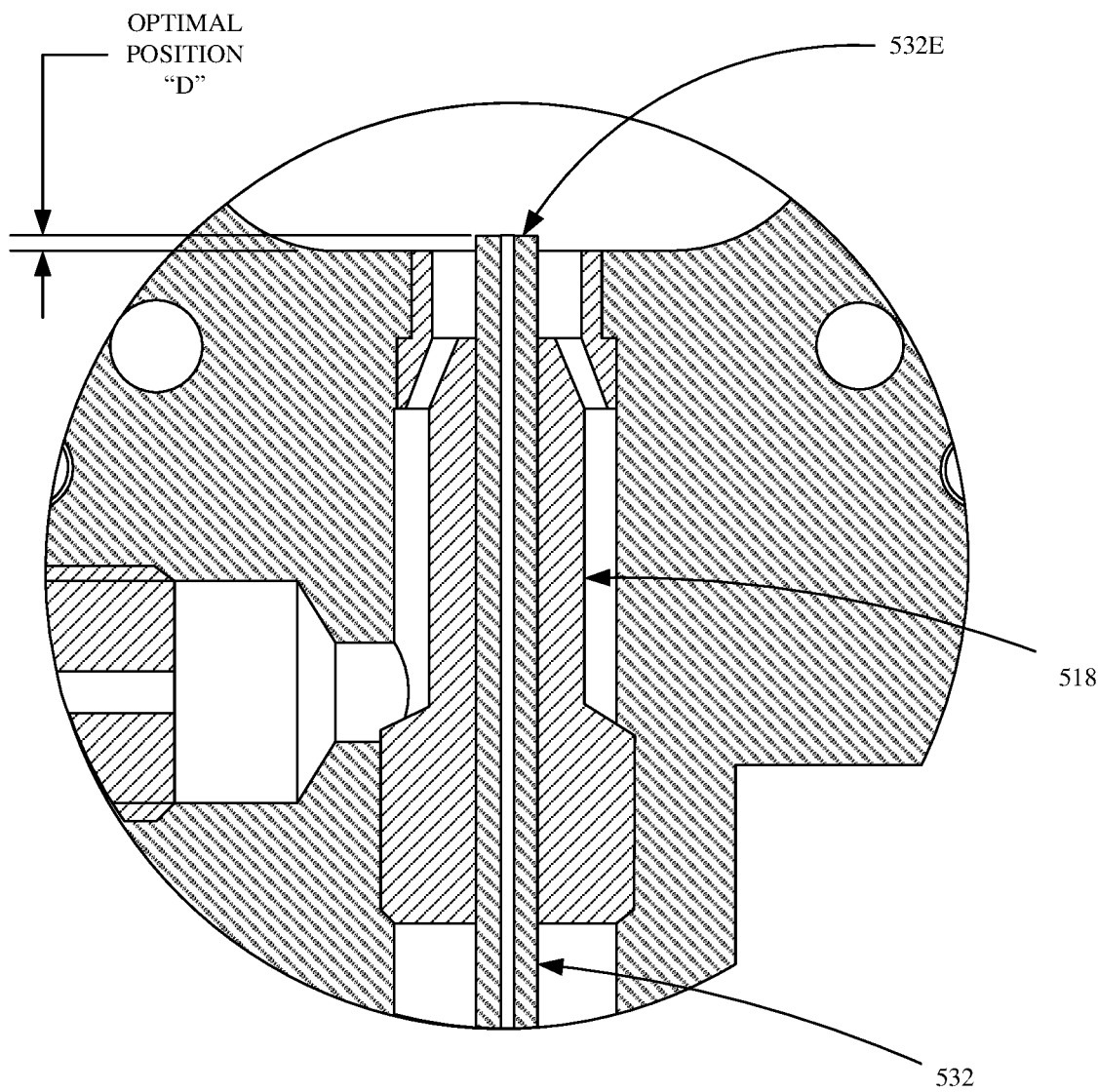

For clarity of explanation, FIG. 7C is a cross sectional view taken across line A-A in FIG. 7B. Similarly, FIG. 7D is a cross-sectional view taken across line B-B in FIG. 7B. FIG. 7E is a partial cutaway view of the micro flame photometric detector. FIG. 7F is an enlarged cross-sectional view taken from circle "C" in FIG. 7D.

Air generally enters the burner through fitting 516, hydrogen through fitting 517, and sample gas from the column through fitting 530. Air and hydrogen are mixed at gas mixer 518 and burn in combustion chamber 560. Burnt gases then vent through exhaust paths 540A and 540B of combustion chamber body 510, paths 541A, 541B, and 541C of connector 512, then path 542 of fitting 514. Crossing drill holes for exhaust paths can be simply plugged by standard steel balls 513A and 513B to simplify and minimize the physical size of the burner. However, the exhaust paths can be plugged in any suitable manner.

Figure 8:
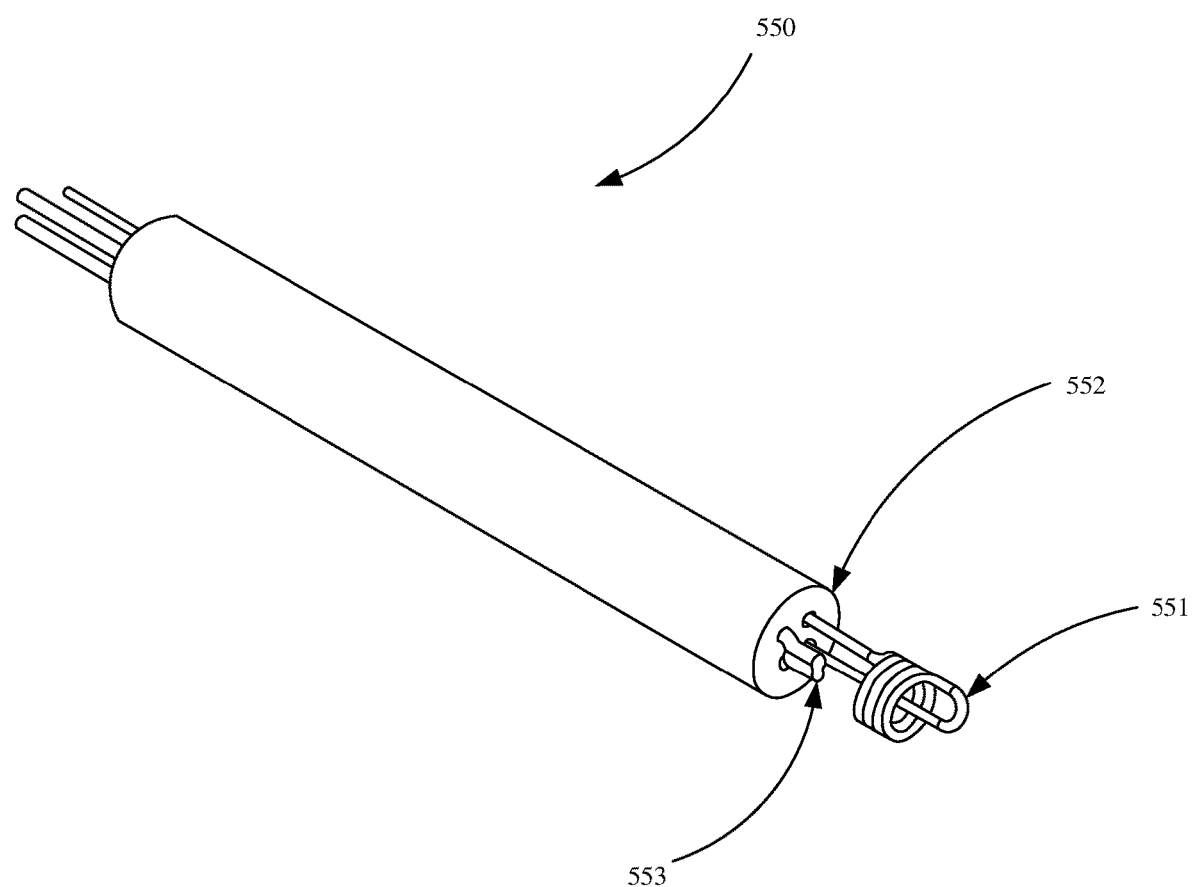
FIG. 8 is a perspective view of a combination thermocouple/ignitor assembly for a micro flame photometric detector in accordance with an embodiment of the present invention.

FIG. 8 is a perspective view of a combination thermocouple/ignitor assembly for a micro flame photometric detector in accordance with an embodiment of the present invention. In the structure shown in FIG. 8, the igniter and thermocouple required for the flame photometric detector are integrated together. This integrated structure 550 requires only single access to the combustion chamber 560 shown in FIGS. 7D and 7E.

Figure 9:
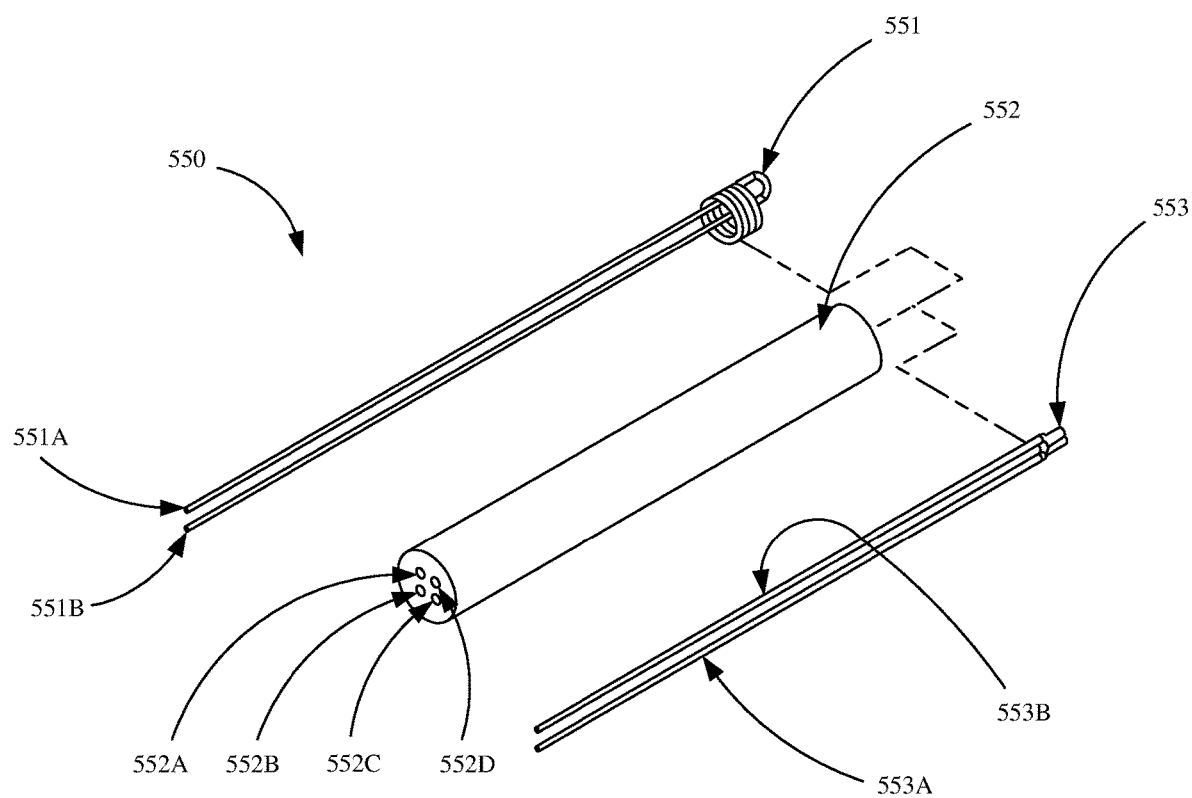
FIG. 9 is an exploded view of a combination thermocouple/ignitor assembly for a micro flame photometric detector in accordance with an embodiment of the present invention.

FIG. 9 is an exploded view of a combination thermocouple/ignitor assembly for a micro flame photometric detector in accordance with an embodiment of the present invention. The integrated temperature sensing igniter 550 is generally composed of a high temperature insulative material, such as ceramic tube 552 having four bores extending axially therethrough. Igniter 551 and thermocouple 553 extend through two of the bores while leads 551A and 551B of igniter 551 go through bores 552A and 552B of ceramic tube 552. Leads 553A and 553B go through bores 552C and 552D of ceramic tube 552. Leads 551A, 551B, 553A, and 553B are operatively coupled to controller 226 or other suitable circuitry in order to control ignition and detect temperature within combustion chamber 560. The four-bore ceramic tube 552 provides cost effective insulation among the leads of both igniter 551 and thermocouple 553.

The responses of a flame photometric detector are very sensitive to the relative position D (shown in FIG. 7F) between the end of the sample tube 532 and gas mixer 518. The responses of the flame photometric detector can be changed by adjusting the end position 532E of sample tube 532. Optimal position "D" is found once the responses of the flame photometric detector are maximized.

Figure 10:
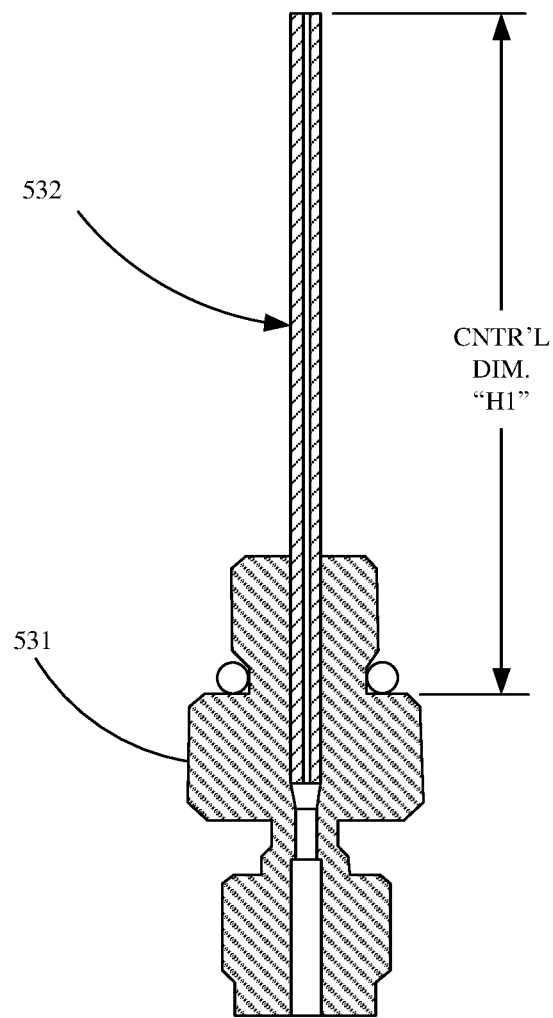
FIG. 10 is a cross sectional view of a sample tube assembly of a micro flame photometric detector is accordance with an embodiment of the present invention.

As shown in FIGS. 7F and 10-12, dimension H1 can be calculated as H1=D+H2+H3, as illustrated in FIG. 7D. Dimension H1 is shown in FIG. 10 relative to fitting 531. Sample tube 532 is generally pressed into modified fitting 531 allowing dimension H1 to be easily controlled mechanically. In other words, optimal position "D" can be achieved by properly controlling dimension H1 of the sample tube assembly as shown in FIG. 10.

Figure 11:
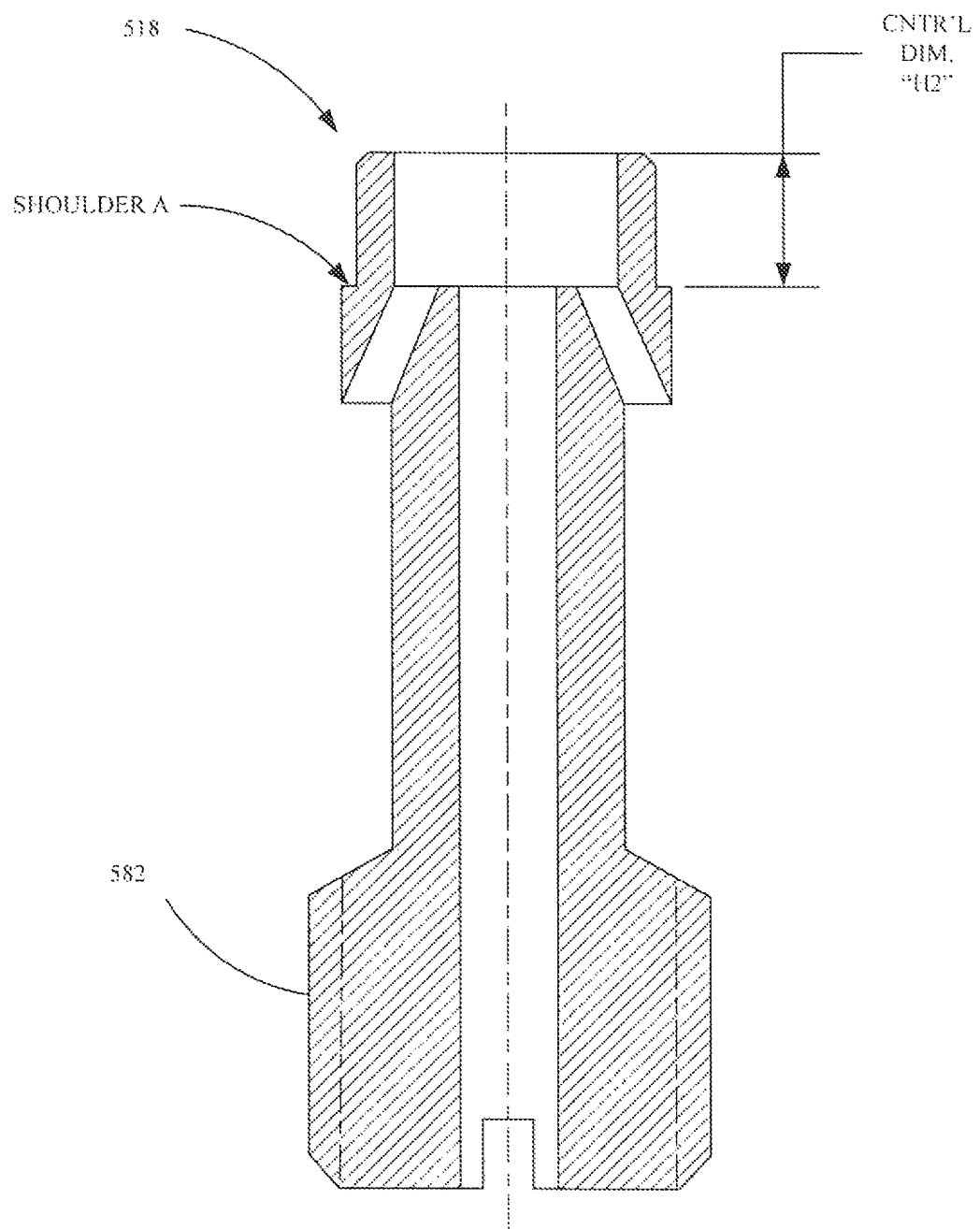
FIG. 11 is a gas mixer of a micro flame photometric detector in accordance with embodiments of the present invention.

Dimension H2 is illustrated in FIG. 11 with respect to gas mixer 518. The position of gas mixer 518 within combustion chamber body 510 is determined by shoulder "A" (shown in FIG. 11) and stop "B" of combustion chamber body 510 (shown in FIG. 12). Gas mixer 518 is secured in the combustion chamber body 510 by external threads 582 that engage internal threads in the combustion chamber body 510.

Figure 12:
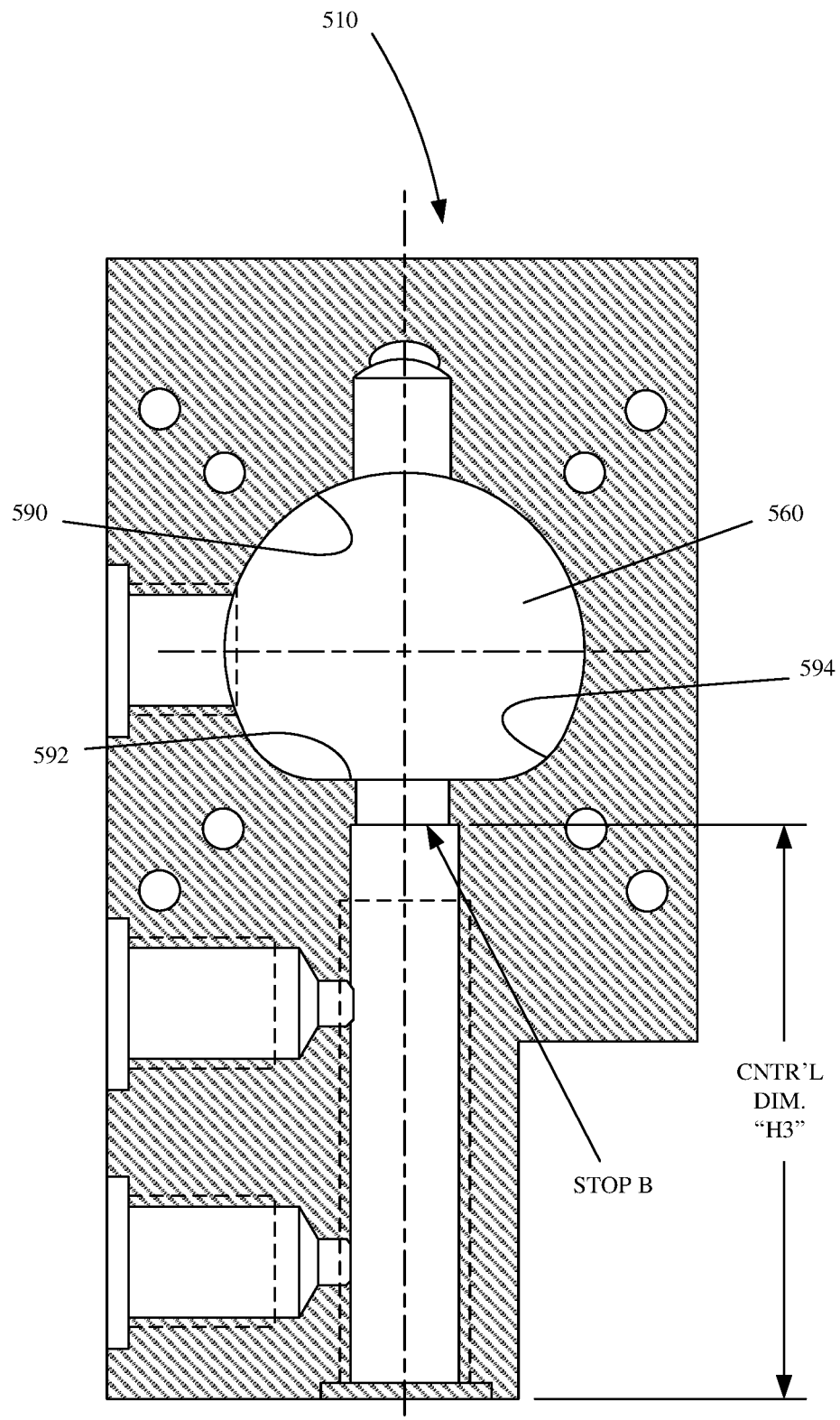
FIG. 12 is a cross-sectional view of a micro flame photometric detector in accordance with an embodiment of the present invention.

Dimension H3 is illustrated in FIG. 12 relative to the combustion chamber body 510. Accordingly, optimal position D can be achieved by controlling H1 of the sample tube assembly, H2 of the gas mixer 518, and H3 of combustion chamber body 510 during manufacture. This means that the position can be pre-optimized by the manufacturer and thus not require any additional optimization from the user. As used herein, "pre-optimization" refers to optimization of position D by the manufacturer or during manufacture of the system. This is in contrast to prior designs, such as that illustrated with respect to FIG. 6B, which require user optimization of each produced system by a user. The repeatability of responses among flame photometric detectors is then well controlled and the effort to set up the flame photometric detector is significantly reduced.

As shown in FIG. 12, combustion chamber 560 generally includes a curved upper portion 590 that meets a flattened lower portion 592 at rounded portions 594. This half-round shape of combustion chamber 560 is believed to help minimize the physical size of the FPD burner.

While embodiments described thus far generally provide a micro flame photometric detector that can be mounted within a temperature-controlled oven of a process gas chromatograph, it is believed that at least some embodiments described herein also facilitate easier and lower cost manufacture. For example, as shown in FIGS. 7D, 7E, and 7F, combustion chamber body 510 and gas mixer 518 are designed such that gas mixer 518 can be assembled from the bottom up.

Although the present invention has been described with reference to preferred embodiments, workers skilled in the art will recognize that changes may be made in form and detail without departing from the spirit and scope of the invention.

What is claimed is:

1. A flame photometric detector for a process gas chromatograph, the flame photometric detector comprising:
   a combustion chamber body defining a combustion chamber therein;
   a sample inlet tube configured to introduce a process gas sample into the combustion chamber;
   an ignitor configured to initiate combustion within the combustion chamber;
   a thermocouple assembly configured to provide an indication of temperature within the combustion chamber;
   wherein the sample inlet tube has an end that is adjustable relative to the combustion chamber; and
   a gas mixer threadably disposed within the combustion chamber body, and wherein rotation of the gas mixer affects the adjustable position of the end of the sample inlet tube relative to the combustion chamber.

2. The flame photometric detector of claim 1, wherein the combustion chamber has a substantially half round shape.

3. The flame photometric detector of claim 1, wherein the combustion chamber has a substantially flat bottom.

4. The flame photometric detector of claim 1, wherein the ignitor and the thermocouple assembly are mounted to a single tube that extends into the combustion chamber.

5. The flame photometric detector of claim 1, wherein the adjustable position of the end of the sample inlet tube is pre-optimized for detector response.

6. The flame photometric detector of claim 1, wherein:
   a flame photometric detector is operably coupled to at least one chromatographic column and is disposed within a temperature-controlled oven, the flame photometric detector being configured to combust a sample of process gas and provide an indication of a flame combusting the sample.

7. The flame photometric detector of claim 6, wherein the ignitor and the thermocouple assembly enter the combustion chamber of the flame photometric detector via a single aperture.

8. The flame photometric detector of claim 7, wherein the ignitor and the thermocouple assembly are mounted to a single tube that extends into the combustion chamber.

9. The flame photometric detector of claim 8, wherein the single tube is formed of ceramic.

10. The flame photometric detector of claim 6, wherein the flame photometric detector includes internal combustion exhaust passageways.

11. The process gas chromatograph of claim 6, wherein the combustion chamber has a substantially flat bottom.

12. A flame photometric detector for a process gas chromatograph, the flame photometric detector comprising:
- a combustion chamber body defining a combustion chamber therein;
- a sample inlet tube configured to introduce a process gas sample into the combustion chamber;
- an ignitor configured to initiate combustion within the combustion chamber;
- a thermocouple assembly configured to provide an indication of temperature within the combustion chamber; and
- wherein the combustion chamber includes a flat surface proximate an end of the sample inlet tube, a partially round surface having a zenith distal the flat surface, and a major are intersecting the zenith and contacting the flat surface.

* * * * *